(12) United States Patent
Horneck

(10) Patent No.: US 7,806,462 B2
(45) Date of Patent: Oct. 5, 2010

(54) DEVICE FOR GUIDING A DROP WINDOW

(75) Inventor: Michael Horneck, Rüsselsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/260,905

(22) Filed: Oct. 29, 2008

(65) Prior Publication Data

US 2009/0113807 A1 May 7, 2009

(30) Foreign Application Priority Data

Nov. 5, 2007 (DE) .................. 10 2007 052 618

(51) Int. Cl.
*B60J 5/00* (2006.01)
(52) U.S. Cl. ................... 296/146.2; 49/502
(58) Field of Classification Search .......... 296/146.2, 296/146.3, 146.16, 146.9, 154; 49/502
See application file for complete search history.

(56) References Cited

U.S. PATENT DOCUMENTS

| | | | | |
|---|---|---|---|---|
| 4,432,167 | A * | 2/1984 | Watanuki | 49/502 |
| 4,605,260 | A * | 8/1986 | Sakakibara et al. | 296/201 |
| 4,924,630 | A * | 5/1990 | Lomasney et al. | 49/502 |
| 5,746,471 | A * | 5/1998 | Teramoto et al. | 296/146.1 |
| 6,231,112 | B1 * | 5/2001 | Fukumoto et al. | 296/146.5 |
| 6,302,473 | B1 * | 10/2001 | Weber | 296/146.6 |
| 6,966,601 | B2 * | 11/2005 | Matsumoto et al. | 296/146.2 |
| 7,097,742 | B2 * | 8/2006 | Furuse | 296/146.6 |
| 7,156,417 | B2 * | 1/2007 | Peng | 280/730.2 |
| 7,210,730 | B2 * | 5/2007 | Fujita et al. | 296/146.5 |
| 2002/0073627 | A1 * | 6/2002 | Hock | 49/502 |
| 2007/0199248 | A1 * | 8/2007 | Rieder et al. | 49/502 |
| 2008/0127569 | A1 * | 6/2008 | Boddy et al. | 49/502 |
| 2009/0051193 | A1 * | 2/2009 | Hernandez et al. | 296/146.2 |
| 2009/0160211 | A1 * | 6/2009 | Krishnan et al. | 296/146.4 |
| 2009/0165392 | A1 * | 7/2009 | Totani et al. | 49/502 |

FOREIGN PATENT DOCUMENTS

| | | |
|---|---|---|
| DE | 4430862 A1 | 3/1995 |
| DE | 19962988 A1 | 5/2000 |
| DE | 102005016455 A1 | 10/2006 |
| WO | 9815421 A1 | 4/1998 |

OTHER PUBLICATIONS

German Patent Office, German Search Report for German Application No. 102007052618.2, May 15, 2008.

* cited by examiner

*Primary Examiner*—Jason S Morrow
(74) *Attorney, Agent, or Firm*—Ingrassia Fisher & Lorenz, P.C.

(57) ABSTRACT

A device for guiding a drop window on a guide rail is provided that is inclined relative to the vertical line and a horizontal shaft rail. The device includes, but is not limited to a deflector that is fixed on the guide rail and includes, but is not limited to a vertical edge. The vertical edge extends up to the shaft rail. The deflector prevents the admission of dirt and noises between the shaft rail and the guide rail.

8 Claims, 2 Drawing Sheets

DEVICE FOR GUIDING A DROP WINDOW

CROSS-REFERENCE TO RELATED APPLICATION

This application claims priority to German Patent Application No. 102007052618.2, filed Nov. 5, 2007, which is incorporated herein by reference in its entirety.

TECHNICAL FIELD

The technical field pertains to a device for guiding a drop window in a vehicle door of a motor vehicle that includes, but is not limited to a horizontal shaft rail that adjoins the drop window and a guide rail that is inclined relative to the vertical line, as well as a horizontal flange of the vehicle door in order to mount the shaft rail.

BACKGROUND

Devices for guiding a drop window in a vehicle door of a motor vehicle need to be very tight in order to prevent noises or dirt from being admitted into the interior of the motor vehicle and are known from practical applications. In conventional devices of this type, the shaft rail seals a gap formed by flanges of the vehicle door together with the drop window and a sealing lip that adjoins the drop window. However, the connection of the shaft rail to the guide rail cannot be reliably ensured. This is the case, in particular, if the shaft rail should be vertically mounted on the flange of the vehicle door. Depending on the incline of the guide rail relative to the vertical line, this results in a section on the flange of the vehicle door that cannot be covered with the shaft rail. This section can result in undesirable noise or dirt being admitted into the interior of the motor vehicle.

In view of the foregoing, at least one objective exists to realize a device of the initially cited type for guiding a drop window in such a way that it permanently prevents the admission of noises or dirt into the interior of the motor vehicle. In addition, other objectives, desirable features, and characteristics will become apparent from the subsequent summary and detailed description, and the appended claims, taken in conjunction with the accompanying drawings and this background.

According to an embodiment of the invention, this at least one objective, other objectives, desirable features, and characteristics, are attained in that a deflector extends from the guide rail up to a flange of the vehicle door and features a vertical edge that is guided up to the shaft rail.

Due to this design, a section between the guide rail and the shaft rail is covered by the deflector. The deflector consequently compensates the incline of the guide rail relative to the vertical line and therefore also prevents a gap from forming between the guide rail and the shaft rail if the guide rail is significantly inclined relative to the vertical line. The deflector can thusly prevent the admission of noises or dirt into the interior of the motor vehicle.

In known devices of this type, the shaft rail is individually fixed on a clamp that is mounted on the flange of the vehicle door. This clamp also serves for mounting an inside lining of the motor vehicle that faces the interior of the motor vehicle. The device in accordance with embodiments of the invention, however, is composed of only a few components that can be installed very easily if the shaft rail is fixed on an inside lining of the motor vehicle. This makes it possible to easily combine the shaft rail and the inside lining into a pre-assembled unit. This pre-assembled unit can subsequently be fixed on the flange of the vehicle door, preferably by being attached vertically.

According to another advantageous additional development of embodiments of the invention, the deflector provides sufficient protection from dirt and noises if it has an essentially triangular shape.

According to an advantageous additional development of embodiments of the invention, the deflector can be installed in a particularly simple fashion if it is fixed in the guide rail.

According to another advantageous additional development of embodiments of the invention, the deflector can also be installed in a particularly simple fashion if it features elements for producing a snap-on connection in the guide rail.

In order to further simplify the installation of the deflector, another advantageous additional development of embodiments of the invention proposes that the snap-on connection of the deflector in the guide rail features a locking hook that is realized integrally with the deflector.

The integral design of the deflector and the locking hook can be achieved in a particularly simple fashion in accordance with another advantageous additional embodiment of the invention, in which the deflector is realized in the form of a sheet of spring steel.

According to another advantageous additional embodiment of the invention, the connection between the deflector and the guide rail is particularly stable if the deflector is screwed or riveted to the guide rail at a distant location referred to the snap-on connection.

The device in accordance with an embodiment of the invention has a particularly simple constructive design if the guide rail and/or the shaft rail is/are realized integrally with a sealing lip that adjoins the drop window.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
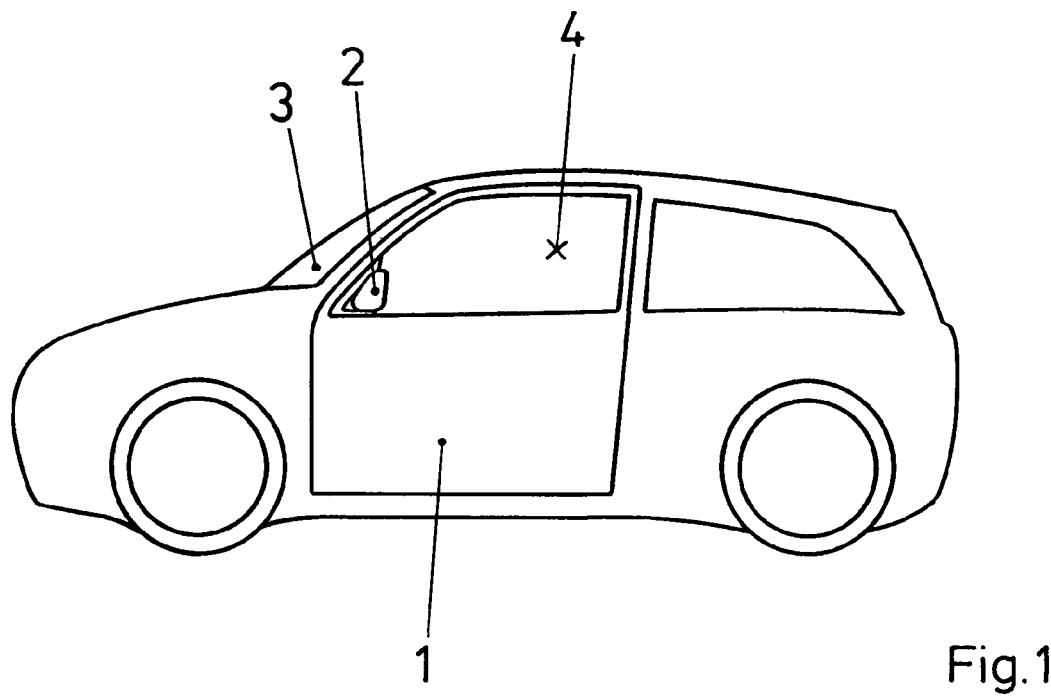
FIG. 1 shows an inventive motor vehicle with a vehicle door.

FIG. 1 shows a motor vehicle with a vehicle door 1, an exterior rearview mirror 2 and a front windshield 3 that points in the driving direction of the motor vehicle. A drop window 4 can be lowered into the vehicle door 1. The vehicle door 1 shown is the driver's door.

Figure 2:
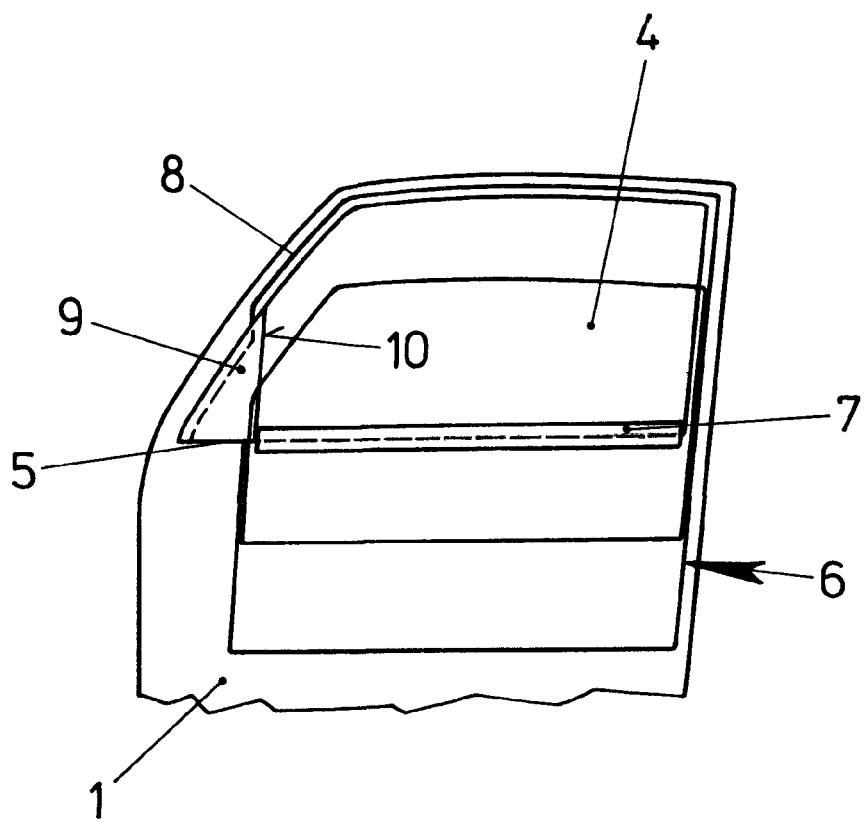
FIG. 2 shows an enlarged representation of the vehicle door according to FIG. 1 with a drop window and a deflector.

FIG. 2 shows an enlarged representation of part of the vehicle door 1 with the drop window 4 according to FIG. 1. In order to simplify the illustration, a skin of the vehicle body and the exterior rearview mirror 2 of the vehicle door 1 are not shown. Consequently, a shaft 6 is visible that serves for accommodating the drop window 4 in the lowered state, and the upper boundary of the shaft is formed by a flange 5 of the vehicle door 1. A shaft rail 7 is fixed on the flange 5 of the vehicle door 1. In addition, the vehicle door 1 features a guide rail 8 for guiding the drop window 4. The guide rail 8 is inclined relative to the vertical line and carries a deflector 9. The deflector 9 features a vertical edge 10 that extends up to the flange 5 of the vehicle door 1 on its side that faces away from the guide rail 8. The deflector 9 extends up to the shaft rail 7 and therefore spans the distance between the guide rail 8 and the shaft rail 7. The deflector 9 is arranged underneath or behind the exterior rearview mirror 2 illustrated in FIG. 1.

Figure 3:
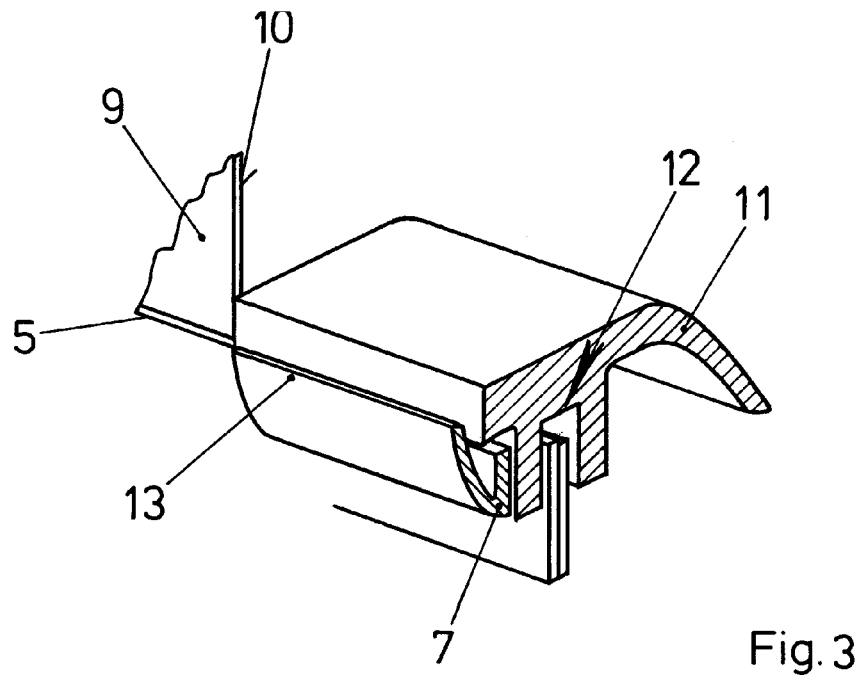
FIG. 3 shows an enlarged representation of part of the vehicle door with a shaft rail and adjoining regions of the deflector.

FIG. 3 shows an enlarged perspective representation of the connection of the shaft rail 7 on the deflector 9. According to this figure, the shaft rail 7 is fixed on an inside lining 11 of the vehicle door 1 of the motor vehicle. The inside lining 11 features a groove 12 for being attached to the flange 5 of the vehicle door 1 and forms a pre-assembled structural unit together with the shaft rail 7. The installation of the inside lining 11 on the flange 5 takes place in the vertical direction along the edge 10 of the deflector 9. The deflector 9 directly adjoins the shaft rail 7. FIG. 3 also shows that the shaft rail 7 is realized integrally with a sealing lip 13 that adjoins the drop window 4.

Figure 4:
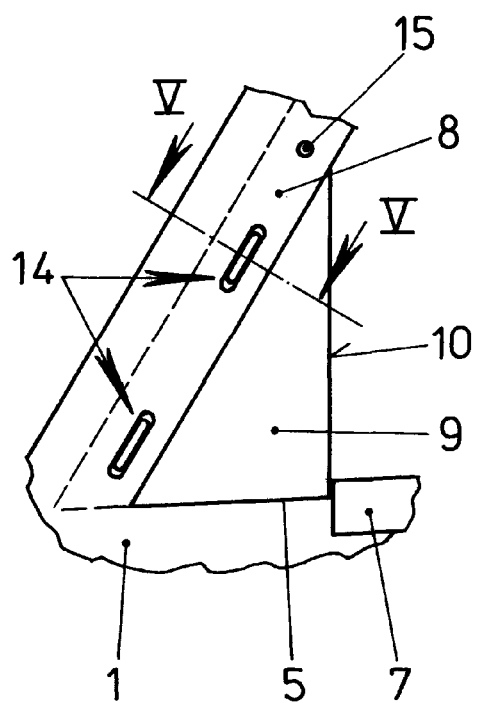
FIG. 4 shows an enlarged representation of part of the vehicle door with a guide rail and adjoining regions of the deflector.
Figure 5:
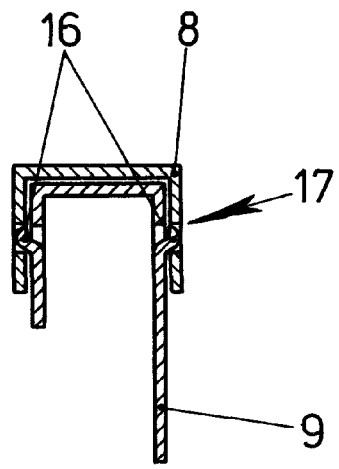
FIG. 5 shows a sectional representation of the guide rail and the deflector according to FIG. 4 along the line V-V.

FIG. 4 shows part of the vehicle door 1 with the guide rail 8 and the deflector 9. The deflector 9 features elements for producing snap-on connections 14 in the guide rail 8, as well as a riveted connection 15 at a distant location referred to the snap-on connections 14. FIG. 5 shows a section along the line V-V in FIG. 4, in which the snap-on connections 14 feature locking hooks 16 that are realized integrally with the deflector 9. The locking hooks 16 penetrate into recesses 17 of the guide rail 8 in order to mount the deflector 9. The deflector 9 is manufactured of spring steel for this purpose.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for guiding a drop window in a vehicle door of a motor vehicle, comprising:
   a horizontal shaft rail adjoining the drop window;
   a guide rail inclined relative to a vertical line;
   a horizontal flange of the vehicle door adapted to mount the horizontal shaft rail; and
   a deflector extending from the guide rail to the horizontal flange and comprising a vertical edge that extends from the horizontal shaft rail, wherein the deflector comprises at least one snap-on element for producing a snap-on connection in the guide rail.

2. The device according to claim 1, wherein the horizontal shaft rail is fixed on an inside lining of the motor vehicle.

3. The device according to claim 1, wherein the deflector has an essentially triangular shape.

4. The device according to claim 1, wherein the deflector is fixed in the guide rail.

5. The device according to claim 1, wherein the snap-on connection comprises a locking hook integrally formed with the deflector.

6. The device according to claim 1, wherein the deflector is at least partially formed of a sheet of spring steel.

7. The device according to claim 1, wherein the deflector is riveted to the guide rail.

8. The device according to claim 1 wherein at least one of the guide rail or the horizontal shaft rail is integrally formed with a sealing lip that adjoins the drop window.

* * * * *